United States Patent
Huo et al.

(10) Patent No.: US 10,991,019 B2
(45) Date of Patent: Apr. 27, 2021

(54) RADIO CHANNEL CONTROL METHOD, TRAFFIC PACKAGE TRADING AND RECOMMENDING METHODS, AND RELATED DEVICE

(71) Applicant: Huawei Technologies Co., Ltd., Shenzhen (CN)

(72) Inventors: Dawei Huo, Shenzhen (CN); Shanfu Li, Shenzhen (CN); Kangmin Huang, Shenzhen (CN); Lei Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 858 days.

(21) Appl. No.: 14/720,424

(22) Filed: May 22, 2015

(65) Prior Publication Data

US 2015/0339748 A1 Nov. 26, 2015

(30) Foreign Application Priority Data

May 23, 2014 (CN) .......................... 2014 1 0223273
Aug. 21, 2014 (CN) .......................... 2014 1 0416249

(51) Int. Cl.
*H04W 28/18* (2009.01)
*H04W 4/24* (2018.01)
(Continued)

(52) U.S. Cl.
CPC ......... *G06Q 30/0619* (2013.01); *G06Q 20/02* (2013.01); *H04M 15/805* (2013.01);
(Continued)

(58) Field of Classification Search
USPC ..................................... 370/235; 705/26.44
See application file for complete search history.

(56) References Cited

U.S. PATENT DOCUMENTS

2005/0243726 A1\* 11/2005 Narendran ............ H04L 47/822
370/238
2011/0238552 A1\* 9/2011 Monogioudis ......... G06Q 40/04
705/37
(Continued)

FOREIGN PATENT DOCUMENTS

CN 101237606 A 8/2008
CN 102300255 A 12/2011
(Continued)

OTHER PUBLICATIONS

"Shaanxi Unicom—Night Flow Package," (Apr. 2013).

*Primary Examiner* — Peter Ludwig
*Assistant Examiner* — Reva R Moore
(74) *Attorney, Agent, or Firm* — Leydig, Voit & Mayer, Ltd.

(57) ABSTRACT

A radio channel control method includes: collecting a real-time user experience index for access to a media service by a user terminal, and collecting a media service transmission parameter of the media service provided by a server; determining whether the real-time user experience index is less than a user experience index defined in a user experience level of an ordered traffic package of the user terminal, and if the real-time user experience index is less than the user experience index defined in the user experience level of the ordered traffic package of the user terminal, calculating, by using the real-time user experience index and the media service transmission parameter, a radio channel parameter that is required by the user experience index; and transmitting the radio channel parameter to a core network device.

19 Claims, 6 Drawing Sheets

A VNO platform collects a real-time user experience indicator for access to a media service (that is, access to the media service that is provided by a server, in a defined time period of an ordered traffic package) by a UE, and collects a media service transmission parameter of the media service provided by the server — 401

The VNO platform determines whether the real-time user experience indicator is lower than a user experience indicator defined in a user experience level of an ordered traffic package of the UE, and if yes, calculates, by using the real-time user experience indicator and the media service transmission parameter, a radio channel parameter that is required by the user experience indicator defined in the user experience level — 402

The VNO platform transmits the calculated radio channel parameter to a core network device, so that the core network device adjusts, according to the radio channel parameter, a radio channel parameter used when the UE accesses the media service — 403

(51) Int. Cl.
*G06Q 30/06* (2012.01)
*H04M 15/00* (2006.01)
*G06Q 20/02* (2012.01)
*H04W 12/06* (2021.01)

(52) U.S. Cl.
CPC ......... *H04M 15/8016* (2013.01); *H04W 4/24* (2013.01); *H04W 12/06* (2013.01); *H04W 28/18* (2013.01)

(56) References Cited

U.S. PATENT DOCUMENTS

| | | |
|---|---|---|
| 2012/0192216 A1 | 7/2012 | Chen et al. |
| 2014/0058943 A1 | 2/2014 | Glencross |
| 2014/0140213 A1* | 5/2014 | Raleigh ................ H04L 65/601 370/235 |
| 2014/0317280 A1 | 10/2014 | Ke |
| 2014/0335820 A1* | 11/2014 | Zhang .................. H04M 15/83 455/406 |

FOREIGN PATENT DOCUMENTS

| | | |
|---|---|---|
| CN | 102523486 A | 6/2012 |
| CN | 102546297 A | 7/2012 |
| CN | 102611676 A | 7/2012 |
| CN | 102710871 A | 10/2012 |
| CN | 102858018 A | 1/2013 |
| CN | 103002512 A | 3/2013 |
| CN | 103068058 A | 4/2013 |
| CN | 103281465 A | 9/2013 |
| CN | 103501231 A | 1/2014 |
| CN | 103596121 A | 2/2014 |
| CN | 103596285 A | 2/2014 |
| CN | 103607691 A | 2/2014 |
| CN | 103632454 A | 3/2014 |
| CN | 103686662 A | 3/2014 |

* cited by examiner

RADIO CHANNEL CONTROL METHOD, TRAFFIC PACKAGE TRADING AND RECOMMENDING METHODS, AND RELATED DEVICE

CROSS-REFERENCE TO RELATED APPLICATIONS

This application claims priority to Chinese Patent Application No. 201410416249.0, filed on Aug. 21, 2014, and claims priority to Chinese Patent Application No. 201410223273.2, filed on May 23, 2014, all of which are hereby incorporated by reference in their entireties

TECHNICAL FIELD

The present invention relates to the field of communications technologies, and in particular, to a radio channel control method, traffic packages trading and recommending methods, and a related device.

BACKGROUND

At present, China Mobile has launched a data exchange platform (2 cm) in Hong Kong, and all users of the 4 G Pro series service plan of China Mobile Hong Kong Company Limited can freely buy and sell a traffic package included in their package plans by using the data exchange platform, to prevent the traffic from becoming invalid due to expiration. A traffic package is freely bought and sold on the data exchange platform in a unit of GB, and is freely priced within a range from HK$ 11 to HK$ 46. In addition, the data exchange platform may also charge a trading fee of HK$ 11 per unit.

However, it is found in practice that, after a user orders a traffic package and in a defined time period of the ordered traffic package, user experience (for example, watching a ball game or watching a video) in accessing a media service cannot be ensured, and enthusiasm for traffic trading cannot be aroused.

SUMMARY

Embodiments of the present invention disclose a radio channel control method, traffic package trading and recommending methods, and a related device, which can ensure, in a defined time period of an ordered traffic package, experience of a user in accessing a media service, to arouse enthusiasm for traffic trading.

A first aspect of the embodiments of the present invention discloses a traffic package trading method, including:

receiving a traffic package query request sent by a user terminal, where the traffic package query request includes a to-be-ordered traffic package parameter, and the to-be-ordered traffic package parameter includes a defined time period for use of a to-be-ordered traffic package or a user experience level of the to-be-ordered traffic package;

performing identity authentication on the user terminal, and if the identity authentication succeeds, querying a to-be-ordered traffic package in conformity with the to-be-ordered traffic package parameter, where the to-be-ordered traffic package meets a requirement of the defined time period or the user experience level, and sending the to-be-ordered traffic package to the user terminal;

receiving an ordered traffic package sent by the user terminal, where the ordered traffic package is a traffic package selected by the user terminal from traffic packages in conformity with the to-be-ordered traffic package parameter, where the ordered traffic package is used in the defined time period, or the user experience level is obtained when the user terminal uses the ordered traffic package; and sending user traffic package update information including information about the ordered traffic package to a billing system, so that the billing system updates, according to the ordered traffic package, a stored traffic package of a user and a stored traffic package of a seller of the ordered traffic package.

In a first possible implementation manner of the first aspect of the embodiments of the present invention, the method further includes:

sending the user traffic package update information including information about the ordered traffic package to a core network device, so that the core network device updates, according to the ordered traffic package, a stored traffic package of the user and a stored traffic package of the seller of the ordered traffic package.

With reference to the first possible implementation manner of the first aspect of the embodiments of the present invention, in a second possible implementation manner of the first aspect of the embodiments of the present invention, the billing system deducts, from an account of the user according to the ordered traffic package, an order amount corresponding to a price of the ordered traffic package, and adds the order amount to an account of the seller.

A second aspect of the embodiments of the present invention discloses a radio channel control method, including:

collecting a real-time user experience index for access to a media service by a user terminal, and collecting a media service transmission parameter of the media service provided by a server;

determining whether the real-time user experience index is less than a user experience index defined in a user experience level of an ordered traffic package of the user terminal, and if the real-time user experience index is less than the user experience index defined in the user experience level of the ordered traffic package of the user terminal, calculating, by using the real-time user experience index and the media service transmission parameter, a radio channel parameter that is required by the user experience index; and transmitting the radio channel parameter to a core network device, so that the core network device adjusts, according to the radio channel parameter, a radio channel parameter used when the user terminal accesses the media service.

In a first possible implementation manner of the second aspect of the embodiments of the present invention, the calculating, by using the real-time user experience index and the media service transmission parameter, a radio channel parameter that is required by the user experience index includes:

calculating a radio channel bandwidth increment according to the media service transmission parameter, where the media service transmission parameter includes a time length of the media service, an average rate of accessing the media service, and a variance of the average rate, or the media service transmission parameter includes a time length of the media service and a variance of an average rate of accessing the media service;

calculating a difference between the user experience index and the real-time user experience index;

calculating a product of the difference, a radio channel scheduling priority defined in the user experience level, and the radio channel bandwidth increment; and calculating a sum of the product and a radio channel bandwidth value defined in the user experience level, and using the sum as a radio channel bandwidth value that is required by the user experience index.

In a second possible implementation manner of the second aspect of the embodiments of the present invention, the calculating, by using the real-time user experience index and the media service transmission parameter, a radio channel parameter that is required by the user experience index includes:

calculating a radio channel scheduling priority increment according to the media service transmission parameter, where the media service transmission parameter includes a time length of the media service, an average rate of accessing the media service, and a variance of the average rate, or the media service transmission parameter includes a time length of the media service and a variance of an average rate of accessing the media service;

calculating a difference between the user experience index and the real-time user experience index; and calculating a product of the difference, a radio channel scheduling priority defined in the user experience level, and the radio channel bandwidth increment, as a radio channel scheduling priority that is required by the user experience index.

With reference to the second aspect, or the first or second possible implementation manner of the second aspect of the embodiments of the present invention, in a third possible implementation manner of the second aspect of the embodiments of the present invention, before the collecting a real-time user experience index for access to a media service by a user terminal, the method further includes:

receiving a traffic package query request sent by the user terminal, where the traffic package query request includes a to-be-ordered traffic package parameter;

performing identity authentication on the user terminal, and if the identity authentication succeeds, querying a traffic package in conformity with the to-be-ordered traffic package parameter, and sending the traffic package to the user terminal;

receiving an ordered traffic package sent by the user terminal, where the ordered traffic package is the traffic package in conformity with the to-be-ordered traffic package parameter; and sending user traffic package update information including information about the ordered traffic package to a billing system, so that the billing system updates, according to the ordered traffic package, a stored traffic package of a user and a stored traffic package of a seller of the ordered traffic package.

With reference to the third possible implementation manner of the second aspect of the embodiments of the present invention, in a fourth possible implementation manner of the second aspect of the embodiments of the present invention, the method further includes:

sending the user traffic package update information including information about the ordered traffic package to the core network device, so that the core network device updates, according to the ordered traffic package, a stored traffic package of the user and a stored traffic package of the seller of the ordered traffic package.

With reference to the fourth possible implementation manner of the second aspect of the embodiments of the present invention, in a fifth possible implementation manner of the second aspect of the embodiments of the present invention, the billing system deducts, from an account of the user according to the ordered traffic package, an order amount corresponding to a price of the ordered traffic package, and adds the order amount to an account of the seller.

With reference to the fifth possible implementation manner of the second aspect of the embodiments of the present invention, in a sixth possible implementation manner of the second aspect of the embodiments of the present invention, after the receiving an ordered traffic package sent by the user terminal, the method further includes:

recording a fee that is deducted from the account of the user and corresponding to the ordered traffic package.

With reference to the second aspect, or the first or second possible implementation manner of the second aspect of the embodiments of the present invention, in a seventh possible implementation manner of the second aspect of the embodiments of the present invention, before the collecting a real-time user experience index for access to a media service by a user terminal, the method further includes:

collecting a real-time user experience index for access to the media service by the user terminal in a defined time period of a current traffic package;

when the real-time user experience index for access to the media service by the user terminal in the defined time period of the current traffic package is less than a preset user experience index, obtaining a media service type of the media service provided by the server;

obtaining a user experience level of the current traffic package and a radio resource utilization rate of a wireless base station to which the user terminal belongs;

when the radio resource utilization rate of the wireless base station to which the user terminal belongs is higher than a preset radio resource utilization rate, comparing whether a user experience level that is required by the media service type is higher than the user experience level of the current traffic package; and if the user experience level that is required by the media service type is higher than the user experience level of the current traffic package, searching for a to-be-ordered traffic package meeting the user experience level that is required by the media service type, and recommending the to-be-ordered traffic package to the user terminal.

A third aspect of the embodiments of the present invention discloses a traffic package recommending method, including:

collecting, by a user terminal, a real-time user experience index for access to a media service by the user terminal;

when the real-time user experience index is less than a preset user experience index, obtaining, by the user terminal, a media service type of the media service provided by a server;

obtaining, by the user terminal, a radio resource utilization rate of a wireless base station to which the user terminal belongs; and when the radio resource utilization rate of the wireless base station to which the user terminal belongs is higher than a preset radio resource utilization rate, accessing, by the user terminal, a traffic trading platform, and searching for a to-be-ordered traffic package meeting a user experience level that is required by the media service type.

In a first possible implementation manner of the third aspect of the embodiments of the present invention, before the when the radio resource utilization rate of the wireless base station to which the user terminal belongs is higher than a preset radio resource utilization rate, accessing, by the user terminal, a traffic trading platform, and actively searching for a to-be-ordered traffic package meeting a user experience level that is required by the media service type, the method further includes:

obtaining, by the user terminal, a user experience level of a current traffic package;

comparing, by the user terminal, whether the user experience level that is required by the media service type is higher than the user experience level of the current traffic package; and if the user experience level that is required by the media service type is higher than the user experience level of the current traffic package, executing the steps of accessing a traffic trading platform and actively searching for a to-be-ordered traffic package meeting a user experience level that is required by the media service type.

With reference to the first possible implementation manner of the third aspect of the embodiments of the present invention, in a second possible implementation manner of the third aspect of the embodiments of the present invention, the obtaining, by the user terminal, a user experience level of a current traffic package and the obtaining, by the user terminal, a radio resource utilization rate of a wireless base station to which the user terminal belongs include:

obtaining, by the user terminal, the user experience level of the current traffic package from a core network device or the traffic trading platform, and obtaining, from a scheduler configured in an RRC of the wireless base station to which the user terminal belongs, the radio resource utilization rate of the wireless base station to which the user terminal belongs.

With reference to the third aspect, or the first or second possible implementation manner of the third aspect of the embodiments of the present invention, in a third possible implementation manner of the third aspect of the embodiments of the present invention, the real-time user experience index includes a real-time mean opinion score MOS score or a quality of service QOS value.

With reference to the third aspect, or the first or second possible implementation manner of the third aspect of the embodiments of the present invention, in a fourth possible implementation manner of the third aspect of the embodiments of the present invention, the to-be-ordered traffic package parameter includes a size, a defined time period, a user experience level, and a price; or the to-be-ordered traffic package parameter includes a size, a defined time period, a user experience level, a price, and a use location.

A fourth aspect of the embodiments of the present invention discloses a traffic trading platform, where the traffic trading platform can implement the methods in the foregoing embodiments, and includes:

a network status module, configured to collect a real-time user experience index for access to a media service by a user terminal, and collect a media service transmission parameter of the media service provided by a server;

a data analyzing and processing module, configured to: determine whether the real-time user experience index is less than a user experience index defined in a user experience level of the ordered traffic package, and if the real-time user experience index is less than the user experience index defined in the user experience level of the ordered traffic package, calculate, by using the real-time user experience index and the media service transmission parameter, a radio channel parameter that is required by the user experience index; and a network control module, configured to transmit the radio channel parameter to a core network device, so that the core network device adjusts, according to the radio channel parameter, a radio channel parameter used when the user terminal accesses the media service.

Specific configurations of the modules of the platform can implement the methods in the foregoing embodiments, and for more specific configurations and functions, refer to the method embodiments.

In a first possible implementation manner of the fourth aspect of the embodiments of the present invention, a manner of calculating, by the data analyzing and processing module by using the real-time user experience index and the media service transmission parameter, the radio channel parameter that is required by the user experience index is specifically that:

the data analyzing and processing module is configured to calculate a radio channel bandwidth value increment according to the media service transmission parameter, where the media service transmission parameter includes a time length of the media service, an average rate of accessing the media service, and a variance of the average rate, or the media service transmission parameter includes a time length of the media service and a variance of an average rate of accessing the media service; calculate a difference between the user experience index and the real-time user experience index; calculate a product of the difference, a radio channel scheduling priority defined in the user experience level, and the radio channel bandwidth increment; and calculate a sum of the product and a radio channel bandwidth value defined in the user experience level, as a radio channel bandwidth value that is required by the user experience level.

In a second possible implementation manner of the fourth aspect of the embodiments of the present invention, a manner of calculating, by the data analyzing and processing module by using the real-time user experience index and the media service transmission parameter, the radio channel parameter that is required by the user experience index is specifically that:

the data analyzing and processing module is configured to calculate a radio channel scheduling priority increment according to the media service transmission parameter, where the media service transmission parameter includes a time length of the media service, an average rate of accessing the media service, and a variance of the average rate, or the media service transmission parameter includes a time length of the media service and a variance of an average rate of accessing the media service; calculate a difference between the user experience index and the real-time user experience index; and calculate a product of the difference, a radio channel scheduling priority defined in the user experience level, and the radio channel bandwidth increment, as a radio channel scheduling priority that is required by the user experience level.

With reference to the fourth aspect, or the first or second possible implementation manner of the fourth aspect of the embodiments of the present invention, in a third possible implementation manner of the fourth aspect of the embodiments of the present invention, the traffic trading platform further includes:

an API interface module, configured to receive a traffic package query request sent by the user terminal, where the traffic package query request includes a to-be-ordered traffic package parameter;

an authentication and management module, configured to perform identity authentication on the user terminal; and a user status module, configured to: after the identity authentication performed by the authentication and management module on the user terminal succeeds, query a traffic package in conformity with the to-be-ordered traffic package parameter, where:

the network control module is further configured to send the traffic package in conformity with the to-be-ordered traffic package parameter to the user terminal.

With reference to the third possible implementation manner of the fourth aspect of the embodiments of the present invention, in a fourth possible implementation manner of the fourth aspect of the embodiments of the present invention, the API interface module is further configured to receive an ordered traffic package sent by the user terminal, where the ordered traffic package is the traffic package in conformity with the to-be-ordered traffic package parameter; and the network control module is further configured to send user traffic package update information including information about the ordered traffic package to a billing system, so that the billing system updates, according to the ordered traffic package, a stored traffic package of a user and a stored traffic package of a seller of the ordered traffic package.

With reference to the fourth possible implementation manner of the fourth aspect of the embodiments of the present invention, in a fifth possible implementation manner of the fourth aspect of the embodiments of the present invention, the network control module is further configured to send the user traffic package update information including information about the ordered traffic package to the core network device, so that the core network device updates, according to the ordered traffic package, a stored traffic package of the user and a stored traffic package of the seller of the ordered traffic package.

With reference to the fifth possible implementation manner of the fourth aspect of the embodiments of the present invention, in a sixth possible implementation manner of the fourth aspect of the embodiments of the present invention, the billing system deducts, from an account of the user according to the ordered traffic package, an order amount corresponding to a price of the ordered traffic package, and adds the order amount to an account of the seller.

With reference to the sixth possible implementation manner of the fourth aspect of the embodiments of the present invention, in a seventh possible implementation manner of the fourth aspect of the embodiments of the present invention, the traffic trading platform further includes:

a billing module, configured to: after the API interface module receives the ordered traffic package sent by the user terminal, record a fee that is deducted from the account of the user and corresponding to the ordered traffic package.

With reference to the fourth aspect, or the first or second possible implementation manner of the fourth aspect of the embodiments of the present invention, in an eighth possible implementation manner of the fourth aspect of the embodiments of the present invention, the network status module is further configured to: before collecting the real-time user experience index for access to the media service by the user terminal, collect a real-time user experience index for access to the media service by the user terminal in a defined time period of a current traffic package; when the real-time user experience index for access to the media service by the user terminal in the defined time period of the current traffic package is less than a preset user experience index, obtain a media service type of the media service provided by the server; and obtain a user experience level of the current traffic package and a radio resource utilization rate of a wireless base station to which the user terminal belongs;

the data analyzing and processing module is further configured to: when the radio resource utilization rate of the wireless base station to which the user terminal belongs is higher than a preset radio resource utilization rate, compare whether a user experience level that is required by the media service type is higher than the user experience level of the current traffic package; and if the user experience level that is required by the media service type is higher than the user experience level of the current traffic package, search for a to-be-ordered traffic package meeting the user experience level that is required by the media service type; and the network control module is further configured to recommend the to-be-ordered traffic package to the user terminal.

A fifth aspect of the embodiments of the present invention discloses a user terminal, including:

a user experience module, configured to collect a real-time user experience index for access to a media service by the user terminal;

a communications module, configured to: when the real-time user experience index is less than a preset user experience index, obtain a media service type of the media service provided by a server;

a traffic trading module, configured to obtain a radio resource utilization rate of a wireless base station to which the user terminal belongs; and a processor module, configured to determine whether the radio resource utilization rate of the wireless base station to which the user terminal belongs is higher than a preset radio resource utilization rate, where:

the traffic trading module is further configured to: when the processor module determines that the radio resource utilization rate of the wireless base station to which the user terminal belongs is higher than the preset radio resource utilization rate, access a traffic trading platform, and actively search for a to-be-ordered traffic package meeting a user experience level that is required by the media service type.

In a first possible implementation manner of the fifth aspect of the embodiments of the present invention, the traffic trading module is further configured to obtain a user experience level of a current traffic package;

the processor module is further configured to: when it is determined that the radio resource utilization rate of the wireless base station to which the user terminal belongs is higher than the preset radio resource utilization rate, compare whether the user experience level that is required by the media service type is higher than the user experience level of the current traffic package; and the traffic trading module is further configured to: when the user experience level that is required by the media service type is higher than the user experience level of the current traffic package, execute the steps of accessing a traffic trading platform and actively searching for a to-be-ordered traffic package meeting a user experience level that is required by the media service type.

In a second possible implementation manner of the fourth aspect of the embodiments of the present invention, a manner of obtaining, by the traffic trading module, the user experience level of the current traffic package and the radio resource utilization rate of the wireless base station to which the user terminal belongs is specifically that:

the traffic trading module is configured to obtain the user experience level of the current traffic package from a core network device or the traffic trading platform, and obtain, from a scheduler configured for RRC of the wireless base station to which the user terminal belongs, the radio resource utilization rate of the wireless base station to which the user terminal belongs.

According to the embodiments of the present invention, a real-time user experience index for access to a media service by a UE and a media service transmission parameter of the media service provided by a server may be collected. On this basis, when it is determined that the real-time user experience index is less than a user experience index defined in a user experience level of an ordered traffic package of the UE, a radio channel parameter that is required by the user experience index may be calculated by using the real-time user experience index and the media service transmission parameter; and the radio channel parameter is transmitted to a core network device, so that the core network device may adjust, according to the radio channel parameter, a radio channel parameter used when the UE accesses the media service, thereby ensuring experience of a user in accessing the media service. It can be seen that the embodiments of the present invention can ensure, in a defined time period of an ordered traffic package, experience of a user in accessing a media service, and can arouse enthusiasm of the user for traffic trading.

In addition, according to the embodiments of the present invention, a UE may also intelligently search for a to-be-ordered traffic package meeting a user experience level that is required by a media service type, to ensure experience of a user in accessing a media service, which can arouse enthusiasm for traffic trading.

In addition, according to the embodiments of the present invention, a UE may obtain, by traffic package trading, an ordered traffic package that can ensure experience of a user in accessing a media service, which can arouse enthusiasm for traffic trading.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention disclose a radio channel control method, traffic package trading and recommending methods, and a related device, which can ensure, in a defined time period of an ordered traffic package, experience of a user in accessing a media service, to arouse enthusiasm for traffic trading. The following describes these in detail.

Figure 1:
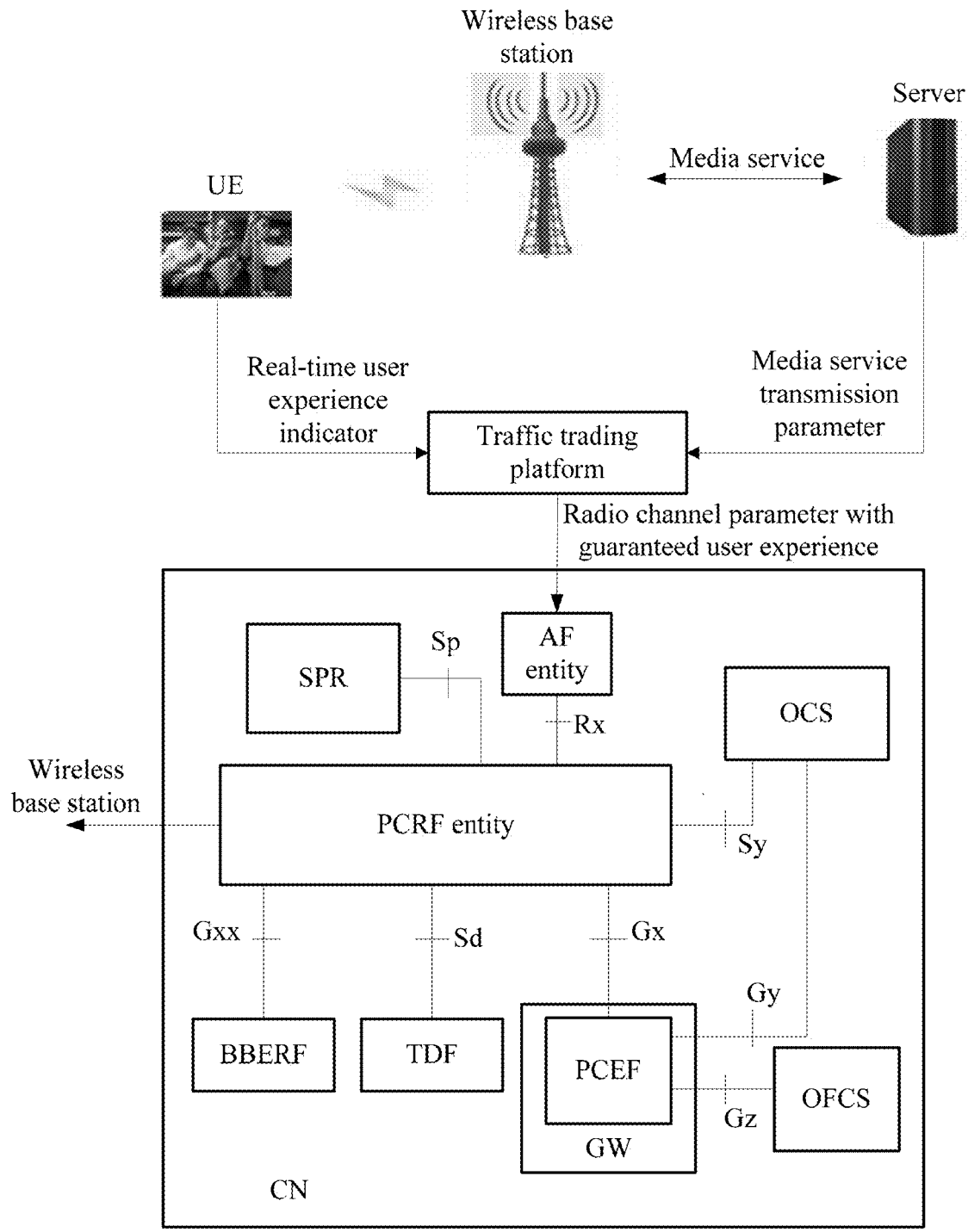
FIG. 1 is a schematic diagram of a network architecture disclosed in an embodiment of the present invention.

For ease of understanding the embodiments of the present invention, the following first describes a network architecture of the embodiments of the present invention. Referring to FIG. 1, FIG. 1 is a schematic diagram of a network architecture disclosed in an embodiment of the present invention. As shown in FIG. 1, the network architecture of this embodiment of the present invention may include a core network (CN), a wireless base station, a traffic trading platform, a server (provided by a media service provider), and a UE. The traffic trading platform may be a virtual network operator (VNO) platform or a traffic trading server of an operator, which is not limited in this embodiment of the present invention. The CN is formed by a policy and charging rules function (PCRF) entity, an application function (Application Function, AF) entity connected to the PCRF entity by using an Rx reference point, an online charging system (OCS) connected to the PCRF entity by using an Sy reference point, a subscription profile repository (SPR) connected to the PCRF entity by using an Sp reference point, a bearing binding and event reporting function (BBERF) entity connected to the PCRF entity by using a Gxx reference point, a traffic detection function (TDF) entity connected to the PCRF entity by using an Sd reference point, a gateway (GW) connected to the PCRF entity by using a Gx reference point, and an offline charging system (OFCS) connected to the GW by using a Gz reference point, where the OCS is connected to the GW by using a Gy reference point, the GW mainly includes a policy and charging enforcement function (PCEF) entity; and the PCRF entity is a core network device of the CN and has a network control function.

In the network architecture shown in FIG. 1, a media service accessed by the UE may be a media service provided by the server; a radio channel used when the UE accesses the media service provided by the server is controlled by the CN (which is mainly the core network device); the traffic trading platform (such as a VNO platform) may collect a real-time user experience index for access to the media service provided by the server by the UE in a defined time period of an ordered traffic package, and may collect a media service transmission parameter of the media service provided by the server; determine whether the real-time user experience index is less than a user experience index defined in a user experience level of the ordered traffic package; if the real-time user experience index is less than the user experience index defined in the user experience level of the ordered traffic package, calculate, by using the real-time user experience index and the media service transmission parameter, a radio channel parameter that is required by the user experience index defined in the user experience level; and transmit the calculated radio channel parameter to the core network device, so that the core network device adjusts, according to the calculated radio channel parameter, a radio channel parameter used when the UE accesses the media service. Therefore, experience of the user in accessing the media service can be ensured, to arouse enthusiasm for traffic trading.

In this embodiment of present invention, the user experience index may be an MOS (that is, mean opinion score) score, a QOS (quality of service) value, a cache size of the UE, and the like; the media service transmission parameter may include a time length of the media service, an average rate of accessing the media service, and a variance of the average rate, or include a time length of the media service, a variance of an average rate of accessing the media service, and the like; and the radio channel parameter may be a radio channel bandwidth, a radio channel scheduling priority, or the like. The embodiments of the present invention will introduce in detail an implementation process of calculating, by using a real-time user experience index and a media service transmission parameter, a radio channel parameter that is required by a user experience index defined in a user experience level, which is not introduced here.

Figure 2:
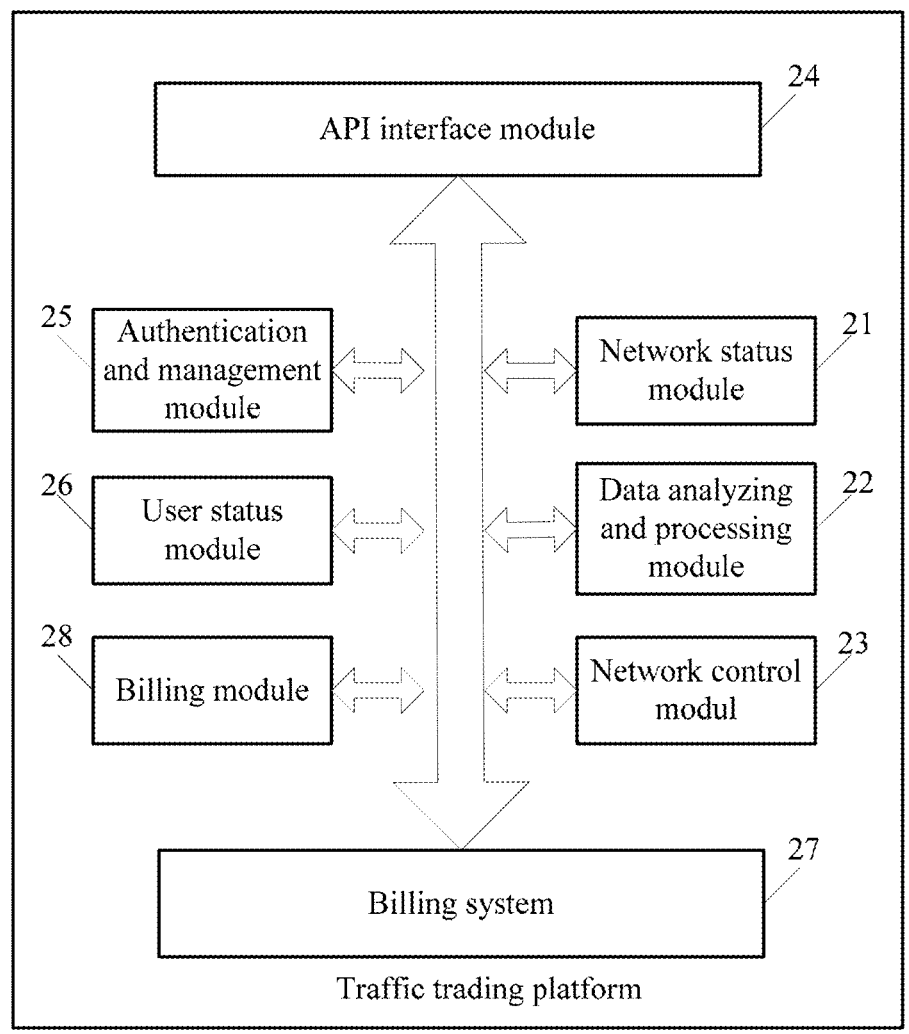
FIG. 2 is a schematic diagram of a modular traffic trading platform disclosed in an embodiment of the present invention.

The following further describes a traffic trading platform involved in the embodiments of the present invention. Referring to FIG. 2, FIG. 2 is a schematic diagram of a modular traffic trading platform disclosed in an embodiment of the present invention. As shown in FIG. 2, the traffic trading platform may include:

a network status module 21, configured to collect a real-time user experience index for access to a media service (for example, access to a media service provided by a server, in a defined time period of an ordered traffic package) by a UE, and collect a media service transmission parameter of the media service provided by the server;

a data analyzing and processing module 22, configured to: determine whether the real-time user experience index is less than a user experience index defined in a user experience level of the ordered traffic package, and if the real-time user experience index is less than the user experience index defined in the user experience level of the ordered traffic package, calculate, by using the real-time user experience index and the media service transmission parameter, a radio channel parameter that is required by the user experience index defined in the user experience level; and a network control module 23, configured to transmit the radio channel parameter to a core network device, so that the core network device adjusts, according to the radio channel parameter, a radio channel parameter used when the UE accesses the media service, thereby ensuring experience of the user in accessing the media service.

In this embodiment of the present invention, the network control module 23 may transmit the radio channel parameter to a PCRF entity by using an AF entity of a CN, so that the PCRF entity adjusts, according to the radio channel parameter, a radio channel parameter used when the UE accesses the media service, thereby ensuring experience of a user in accessing the media service.

In this embodiment of the present invention, the traffic trading platform shown in FIG. 2 may further include: an API interface module 24, an authentication and management module 25, a user status module 26, a billing system (Billing System) 27, and a billing unit 28, where:

the API interface module 24 is configured to receive a traffic package query request sent by the UE, where the traffic package query request includes a to-be-ordered traffic package parameter, and the to-be-ordered traffic package parameter includes a size, a defined time period, a user experience level, and a price that are of the to-be-ordered traffic package parameter;

the authentication and management module 25 is configured to perform identity authentication on the UE;

the user status module 26 is configured to: after the identity authentication performed by the authentication and management module 25 on the UE succeeds, query a traffic package in conformity with the to-be-ordered traffic package parameter; optionally, the user status module 26 is further configured to record and monitor a state of the UE, for example, power-on, roaming, and in arrears;

the network control module 23 is further configured to send the traffic package in conformity with the to-be-ordered traffic package parameter to the UE;

the API interface module 24 is further configured to receive an ordered traffic package sent by the UE, where the ordered traffic package is a traffic package of the to-be-ordered traffic package in conformity with the to-be-ordered traffic package parameter;

the network control module 23 is further configured to send user traffic package update information including information about the ordered traffic package to the billing system 27, so that the billing system 27 updates, according to the ordered traffic package, a stored traffic package of a user and a stored traffic package of a seller of the ordered traffic package, and the billing system 27 deducts, from an account of the user, an order amount corresponding to a price of the ordered traffic package, and adds the order amount to an account of the seller; the network control module 23 is further configured to send the user traffic package update information including information about the ordered traffic package to the core network device, so that the core network device updates, according to the ordered traffic package, a stored traffic package of the user (that is, the user to which the UE belongs) and a stored traffic package of the seller of the ordered traffic package; and the billing module 28 is configured to: after the API interface module 24 receives the ordered traffic package sent by the UE, record a fee that is deducted from the account of the user and corresponding to the ordered traffic package, that is, the billing unit 28 may be configured to record a handling fee for the traffic package trading between the two parties of the traffic package trading.

In another case, the traffic package parameter further includes information about a use location, and the traffic package query request that is sent by the user terminal and received by the API interface module 24 includes the information about the use location; the to-be-ordered traffic package queried by the user status module 26 further meets a requirement of the use location information, and the ordered traffic package is used by the user terminal at the use location.

In this embodiment of the present invention, a manner of calculating, by the data analyzing and processing module 22 by using the real-time user experience index and the media service transmission parameter, the radio channel parameter that is required by the user experience index defined in the user experience level may specifically be that:

the data analyzing and processing module 22 is configured to use the real-time user experience index and the media service transmission parameter as input of a formula $f(bandwith)=Bandwith_o+(MOS_o-MOS_C)*Po*f(t, rate, rate\ variance)$, to calculate the radio channel parameter that is required by the user experience index defined in the user experience level; or the data analyzing and processing module 22 is configured to use the real-time user experience index and the media service transmission parameter as input of a formula $f(priority)=(MOS_o-MOS_C)*Po*f(t, rate, rate\ variance)$, to calculate the radio channel parameter that is required by the user experience index defined in the user experience level, where:

Bandwith$_o$ indicates a radio channel bandwidth defined in the user experience level, MOS$_o$ indicates a user experience index defined in the user experience level, MOS$_C$ indicates a real-time user experience index, Po indicates a radio channel scheduling priority defined in the user experience level, f(t, rate, rate variance) indicates an incremental calculation function, t, rate, and rate variance indicate respectively a time length of a media service, an average rate of accessing the media service, and a variance of the average rate that are included in a media service transmission parameter, f(bandwith) indicates a radio channel bandwidth that is required by MOS$_o$, and f(priority) indicates a radio channel scheduling priority that is required by MOS$_o$. For example, f(t, rate, rate variance) may be implemented by using a product of t, rate, and rate variance, or f(t, rate, rate variance) may be implemented by using a product of t and rate variance.

In this embodiment of the present invention, the network status module 26 is further configured to: before collecting the real-time user experience index for access to the media service provided by the server by the UE in the defined time period of the ordered traffic package, collect a real-time user experience index for access to the media service by the UE in a defined time period of a current traffic package; when the real-time user experience index for access to the media service by the UE in the defined time period of the current traffic package is less than a preset user experience index, obtain a media service type of the media service provided by the server; and obtain a user experience level of the current traffic package and a radio resource utilization rate of a wireless base station to which the UE belongs.

Correspondingly, the data analyzing and processing module 22 is further configured to: when the radio resource utilization rate of the wireless base station to which the UE belongs is higher than a preset radio resource utilization rate, compare whether a user experience level that is required by the media service type is higher than the user experience level of the current traffic package; and if the user experience level that is required by the media service type is higher than the user experience level of the current traffic package, search for a to-be-ordered traffic package meeting the user experience level that is required by the media service type.

Correspondingly, the network control module 23 is further configured to recommend the to-be-ordered traffic package to the UE.

In this embodiment of the present invention, the radio resource utilization rate may include an air interface utilization rate.

In this embodiment of the present invention, a business management point (Business Management Point, BMP) of the billing system 27 may provide a Web interface to communicate with an external unit, and a convergent billing point (Convergent Billing Point, CBP) of the billing system 27 may be configured to record a traffic package of the user, a traffic usage situation, and a deduction; in addition, the convergent billing point may communicate with a GW to notify information such as the traffic usage situation and the deduction situation of the user.

In this embodiment of the present invention, the network control module 23 of the traffic trading platform may send the user traffic package update information including information about the ordered traffic package to the BMP of the billing system 27; after receiving the user traffic package update information, the BMP may send the user traffic package update information to a CBP; the CBP updates, according to the ordered traffic package, the stored traffic package of the user and the stored traffic package of the seller of the ordered traffic package; and the CBP deducts, from the account of the user, the order amount corresponding to the price of the ordered traffic package, and adds the order amount to the account of the seller. Further, the CBP may feed an updated traffic package of the user and an updated traffic package of the seller of the ordered traffic package to the GW and the traffic trading platform (for example, a VNO platform).

As an implementation manner, the network control module 23 may be configured to limit, according to the radio resource utilization rate of the wireless base station, the number of orderable traffic packages with a high user experience level, and specify a defined time period and a use location that are of the to-be-ordered traffic package, to ensure a user experience requirement corresponding to the to-be-ordered traffic package; if the number of traded traffic packages is less than the number of orderable traffic packages, the API interface module 24 may receive the traffic package query request sent by the user terminal.

The foregoing describes the network architecture and the traffic trading platform (for example, a VNO platform) in the embodiments of the present invention, and the following further describes a method disclosed in an embodiment of the present invention. In this embodiment of the present invention, a user may access a VNO platform to complete a trading process of a traffic package. When needing to order another available traffic package, user A needs to first confirm a parameter of a to-be-ordered traffic package, where the parameter includes a size, a defined time period, a user experience level, a price, and the like that are of the traffic package, and the user experience level reflects service assurance provided by a wireless network to the user, and may be an MOS score, a network quality of service (QOS) value (for example, a bandwidth or a delay), or a scheduling priority. The user experience level is mainly reflected by a service experience difference when a user accesses a media service (for example, watching a video) by using a wireless network. For example, for a user with a high user experience level, the wireless network can ensure that the user can watch a high-definition video online smoothly at any time without such situations as pausing and garbling, which affect subjective perception; and for a user with a low user experience level, user experience cannot be ensured in a case of network congestion; and a worst situation is that a user may not be able to access a media service when a network is relatively congested (with simultaneous access of a relatively large number of users).

Figure 3:
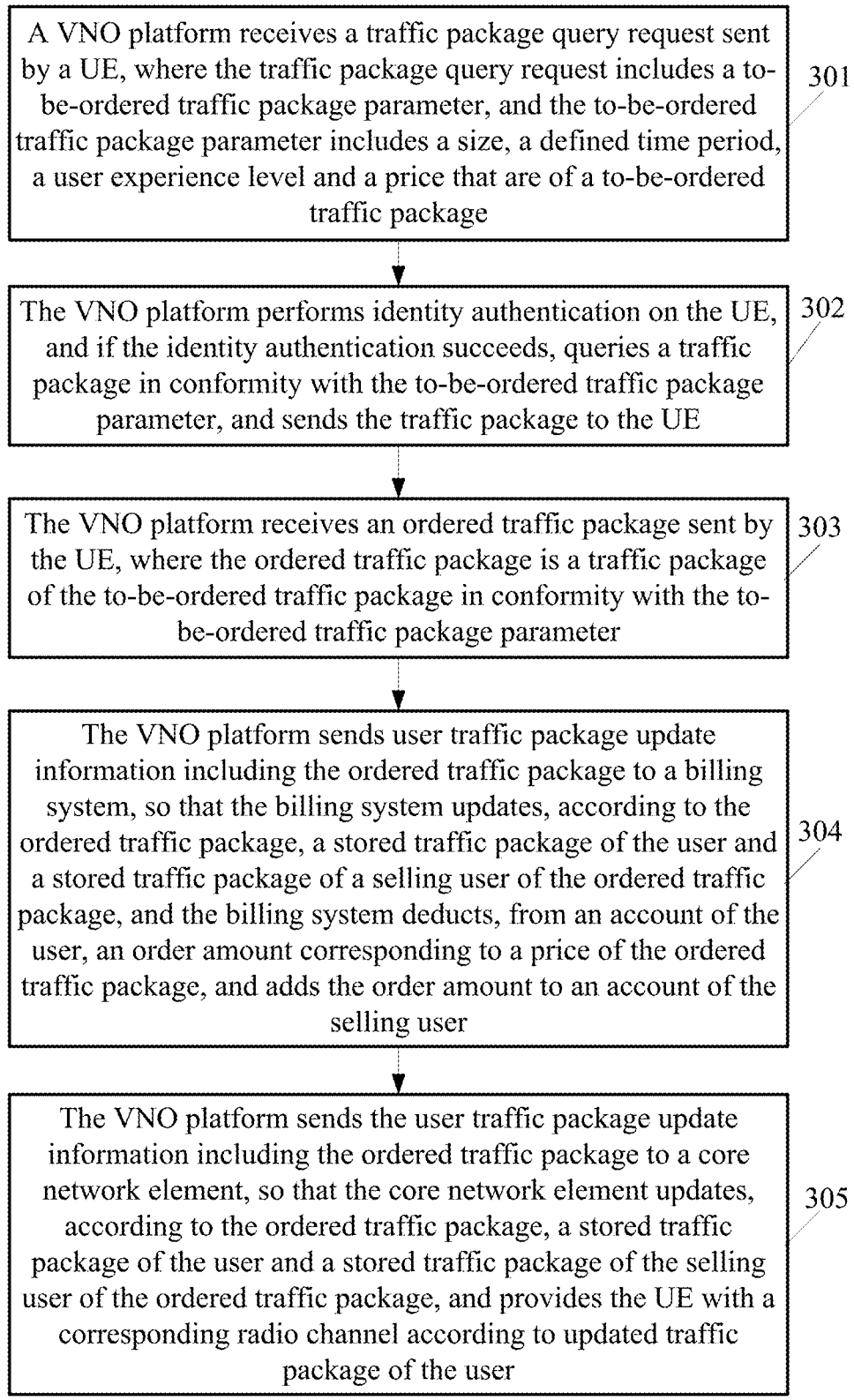
FIG. 3 is a schematic flowchart of a traffic package trading method disclosed in an embodiment of the present invention.

Referring to FIG. 3, FIG. 3 is a schematic flowchart of a traffic package trading method disclosed in an embodiment of the present invention. The method shown in FIG. 3 is described in terms of a VNO platform. The traffic trading platform in the foregoing embodiment may be configured to implement the method, and corresponding modules of the foregoing traffic trading platform may be configured to execute specific steps or configured with specific functions. As shown in FIG. 3, the method may include the following steps:

301: A VNO platform receives a traffic package query request sent by a UE, where the traffic package query request includes a to-be-ordered traffic package parameter, and the to-be-ordered traffic package parameter includes a size, a defined time period, a user experience level, and a price that are of a to-be-ordered traffic package; the to-be-ordered traffic package parameter may further include a use location; and the UE may send the traffic package query request to the VNO platform by using an API interface module provided by the VNO platform. For example, in a more specific embodiment, the traffic package query request includes a to-be-ordered traffic package parameter, and the to-be-ordered traffic package parameter includes a defined time period for use of a to-be-ordered traffic package or a user experience level of the to-be-ordered traffic package.

302: The VNO platform performs identity authentication on the UE, and if the identity authentication succeeds, queries a traffic package in conformity with the to-be-ordered traffic package parameter, and sends the traffic package to the UE, where an authentication and management module of the VNO platform may query registration information of the UE, and perform identity authentication on the UE according to the registration information of the UE. For example, more specifically, the VNO platform performs identity authentication on the user terminal, and if the identity authentication succeeds, queries a to-be-ordered traffic package in conformity with the to-be-ordered traffic package parameter, where the to-be-ordered traffic package is in conformity with a requirement of the defined time period or the user experience level, and sends the to-be-ordered traffic package to the user terminal.

303: The VNO platform receives an ordered traffic package sent by the UE, where the ordered traffic package is a traffic package of the to-be-ordered traffic package in conformity with the to-be-ordered traffic package parameter. Specifically, for example, the ordered traffic package is a traffic package selected by the user terminal from traffic packages in conformity with the to-be-ordered traffic package parameter, where the ordered traffic package is used in the defined time period, or the user experience level is obtained when the user terminal uses the ordered traffic package.

In this embodiment of the present invention, the VNO platform may further confirm legality of the ordered traffic package, which includes checking whether an ordering user meets a purchase condition (a payment mode, an account balance, or the like) and whether the ordered traffic package has been sold; and may even confirm to a CN whether information about the ordered traffic package is accurate. Package information and tariff information of the user are recorded in a user status module of the VNO platform, and may be used to confirm the legality of the ordered traffic package.

In this embodiment of the present invention, the VNO platform may further send an order confirmation notice to both parties of the trading or to only the buyer, and receive information that is fed back by the buyer.

304: The VNO platform sends user traffic package update information including information about the ordered traffic package to a billing system, so that the billing system updates, according to the ordered traffic package, a stored traffic package of the user and a stored traffic package of a seller of the ordered traffic package, and the billing system deducts, from an account of the user, an order amount corresponding to a price of the ordered traffic package, and adds the order amount to an account of the seller; further, a billing module of the VNO platform may record a fee that is deducted from the account of the user and corresponding to the ordered traffic package.

305: The VNO platform sends the user traffic package update information including information about the ordered traffic package to a core network device, so that the core network device updates, according to the ordered traffic package, a stored traffic package of the user and a stored traffic package of the seller of the ordered traffic package, and provides a corresponding radio channel to the UE according to the updated traffic package of the user.

In this embodiment of the present invention, a user experience level may be set with five levels: level 1 to level 5. When a user experience level is 5, a user can obtain a radio channel scheduling priority with a highest level, and can experience a media service smoothly. Even when a network is congested, experience of the user in accessing the media service can still be ensured. Parameters defined in a user experience level are shown in Table 1, and include but are not limited to the following parameters: an MOS score, a bandwidth, and a scheduling priority.

Table 1

| User Experience Level | MOS Score | Bandwidth | Scheduling Priority |
| --- | --- | --- | --- |
| 5 | 4.5 points or above | 100 M | High |
| 4 | 4 points | 50 M | High |
| 3 | 3 points | 20 M | Medium |
| 2 | 2 points | 10 M | Low |
| 1 | 1 point | 5 M | Low |

In this embodiment of the present invention, traffic package trading of a user may include two typical situations. In a first situation, user A first buys a traffic package for a defined time period and a use location with ensured user experience, and user A sells the ordered traffic package that has been bought in advance based on such factors as whether in short supply, price fluctuations, or whether user A needs it; and user B buys the traffic package from user A. A background of trading of the traffic package is that: in a specific future time period, a large number of users will gather at a specific location (for example, a gymnasium with an ongoing event, a concert, or a hot scenic spot in holidays). Because the number of users increases sharply at the location in a specific time period, it is impossible for a wireless network to ensure experience of all users; however, an operator may prepare some traffic packages with a relatively high user experience level in advance for users in need. For example, in a gymnasium, during 19:30-21:30 (a period of an important sport event) on the evening of May 10, the operator provides 1000 10 G traffic packages with a user experience level of 4 by using 50% of air-interface resources and according to an air-interface resource capability of a wireless base station; the remaining 50% of the air-interface resources are used for access of other users, and user experience for access of these users cannot be ensured. Information that is about a traffic package with a user experience level of 4 and obtained by user A is shown in Table 2, and a price is attached when the traffic package is transferred.

TABLE 2

| | Traffic Package of User A |
| --- | --- |
| Time Period | 19:30 - 21:30, May 4, 2014 |
| User Experience Level | 4 |
| Size | 10 G |
| Use Location | XXX gymnasium |
| Transfer Price | HK $100 |

In this embodiment of the present invention, after obtaining the foregoing traffic package (possibly the traffic package is obtained by buying from an operator or buying from a virtual operator, or the traffic package is included in a monthly package, a manner of which is not limited), user A may sell the traffic package by using the VNO platform. User B may buy the traffic package from user A by using the VNO platform, and a price is negotiated by A and B. After the trading is complete, the VNO platform notifies a billing system to modify traffic packages of user A and user B (step 304 in the foregoing procedure), and notifies a core network device of the ordered traffic package (step 305 in the foregoing procedure). The use location is also recorded in the billing system and the CN (for example, a GW). After user B who bought the traffic package moves to a wireless base station corresponding to the location, the wireless network starts to provide, according to a parameter of the traffic package bought by user B and in a defined time period of the traffic package, a radio channel with a corresponding user experience level to user B.

In the foregoing trading manner, a traffic package with ensured user experience can be flexibly traded between users, so that a user really in need can obtain better service experience. In addition, after buying the traffic package from A, user B may trade the traffic package with another user according to an actual need of user B. Through this trading, 1000 traffic packages provided by an air interface with ensured user experience are circulated to users who really need them, thereby enabling reasonable resource allocation and preventing air-interface resources from being wasted.

In addition, a second situation is a trading manner based on a monthly package. Content of the trading may be learned by comparing traffic packages of user A and user B before and after the trading. For example, Table 3 shows a comparison between traffic packages of the two users before trading. User B is a common user, and a user experience level of user B is a default level (level 1 or 2) without assurance. When resources of a wireless network are limited (when the number of access users is large or in a place with network congestion), the user B may not be able to access a media service or has poor access experience (unsmooth video playback, garbling, or pausing). Prices of traffic packages are those of corresponding packages provided by an operator.

TABLE 3

|  | Traffic Package of User A | Traffic Package of User B |
|---|---|---|
| Time Period | 0:00 - 24:00 | 0:00 - 24:00 |
| User Experience Level | 5 | Default |
| Size | 10 G | 5 G |
| Use Location | In China | In China |
| User Type | VIP | Common |
| Price | HK $375 | HK $50 |

During some time periods or in some areas, user A does not need to access a media service, for example, within a month of a traffic package, user A is on a business trip, and does not need to access a media service during 8:00-10:00 in the evening, and does not need the traffic package or user experience assurance for this time period either. Then user A may transfer a 2 G traffic package during this time period by using the VNO platform. User B needs to watch a high-definition television drama in the evening this month, and happens to need a high user experience level. The two users trade the traffic package by using the VNO platform, and after the trading is complete, package information of traffic packages of the two users is shown in Table 4. After the trading is complete, a user experience level of user A becomes a default level during the period of 20:00-22:00, and a traffic package size is reduced to 8 G; correspondingly, a user experience level of user B becomes level 5 during the period of 20:00-22:00, and user B has a 2 G traffic package with a high user experience level during this period. In general, through this trading, user A transfers the 2 G traffic package with a user experience level of 5 for the period of 20:00-22:00 to user B; a price at which the two users trade the traffic package may be negotiated by themselves; and after the trading is complete, a billing system may deduct a corresponding amount from an account of user B and add the amount to an account of user A.

TABLE 4

|  | Traffic Package of User A | | Traffic Package of User B | |
|---|---|---|---|---|
| Time Period | Another time period | 20:00 - 22:00 | Another time period | 20:00 - 22:00 |
| User Experience Level | 5 | Default | Default | 5 |
| Size | 8 G | | 5 G | 2 G |
| Use Location | In China | | In China | |
| User Type | VIP | | Common | |

Figure 4:
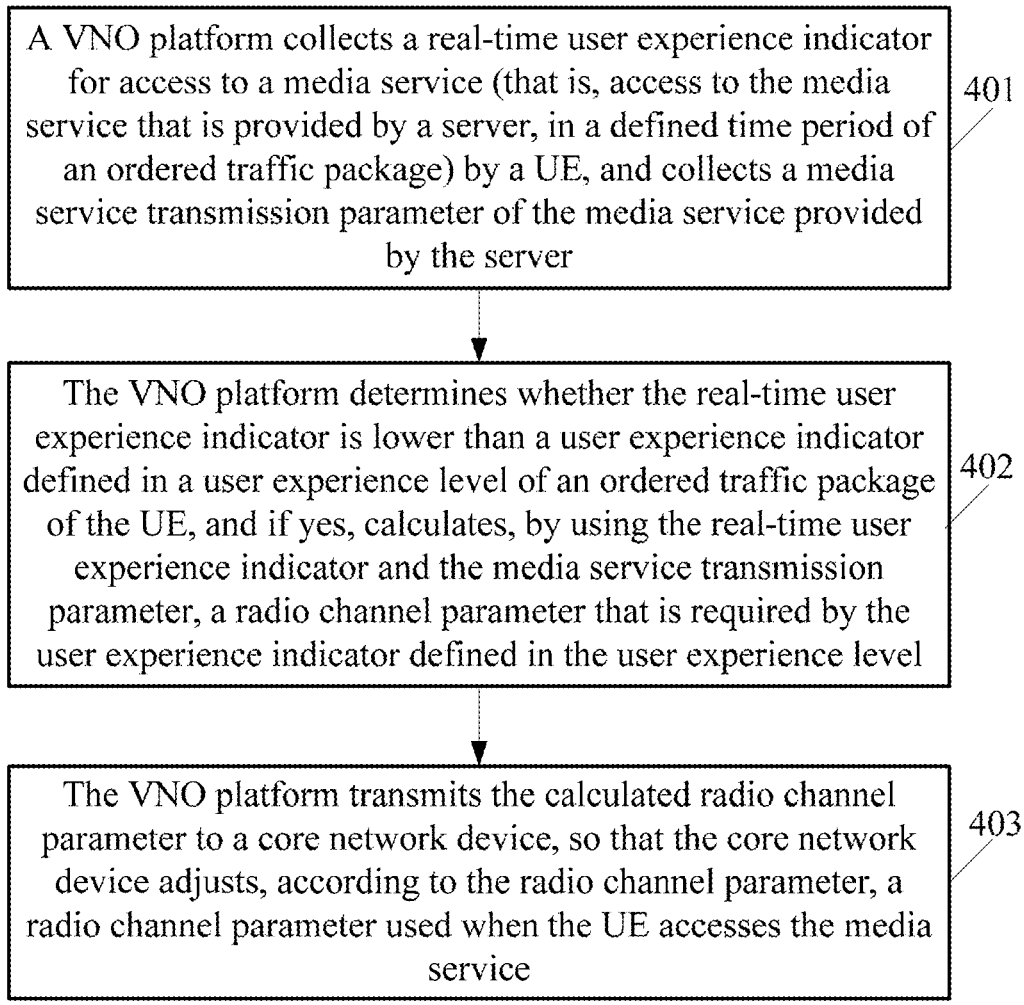
FIG. 4 is a schematic flowchart of a radio channel control method disclosed in an embodiment of the present invention.

In this embodiment of the present invention, after a user completes ordering a traffic package on a VNO platform, when the user accesses, in a defined time period of the ordered traffic package, a media service provided by a server, the VNO platform may control in real time a radio channel for access to the media service by the user, to ensure experience of the user in accessing the media service. Referring to FIG. 4, FIG. 4 is a schematic flowchart of a radio channel control method disclosed in an embodiment of the present invention. As shown in FIG. 4, the radio channel control method may include the following steps:

401: A VNO platform collects a real-time user experience index for access to a media service (that is, access to a media service that is provided by a server, in a defined time period of an ordered traffic package) by a UE, and collects a media service transmission parameter of the media service provided by the server.

In this embodiment of the present invention, the media service transmission parameter may include a time length of the media service, an average rate (rate) of media service access, a variance of the average rate (rate variance), and the like.

402: The VNO platform determines whether the real-time user experience index is less than a user experience index defined in a user experience level of an ordered traffic package of the UE, and if the real-time user experience index is less than the user experience index defined in the user experience level of the ordered traffic package of the UE, calculates, by using the real-time user experience index and the media service transmission parameter, a radio channel parameter that is required by the user experience index defined in the user experience level.

In this embodiment of the present invention, when the radio channel parameter that is required by the user experience index defined in the user experience level is a radio channel bandwidth, the real-time user experience index and the media service transmission parameter may be used as input of a formula $f(bandwith)=Bandwith_o+(MOS_o-MOS_C)*Po*f(t, rate, rate\ variance)$, to calculate the radio channel parameter that is required by the user experience index defined in the user experience level; and when the radio channel parameter that is required by the user experience index defined in the user experience level is a radio channel scheduling priority, the real-time user experience index and the media service transmission parameter are used as input of a formula $f(priority)=(MOS_o-MOS_C)*Po*f(t, rate, rate\ variance)$, to calculate the radio channel parameter that is required by the user experience index defined in the user experience level, where $Bandwith_o$ indicates a radio channel bandwidth defined in the user experience level, $MOS_o$ indicates a user experience index defined in the user experience level, $MOS_C$ indicates a real-time user experience index, Po indicates a radio channel scheduling priority defined in the user experience level, f(t, rate, rate variance) indicates an incremental calculation function, t, rate, and rate variance indicate respectively a time length of a media service, an average rate of accessing the media service, and a variance of the average rate that are included in a media service transmission parameter, f(bandwith) indicates a radio channel bandwidth that is required by $MOS_o$, and f(priority) indicates a radio channel scheduling priority that is required by $MOS_o$.

In this embodiment of the present invention, the real-time user experience index for access to the media service provided by a server by the UE in a defined time period of an ordered traffic package may be an MOS score calculated by the UE in real time, where the UE may comprehensively consider factors such as a cache size of the UE, a real-time rate, a packet loss rate of a media stream, and coding quality, and calculate the real-time MOS score according to these parameters.

403: The VNO platform transmits the calculated radio channel parameter to a core network device, so that the core network device adjusts, according to the radio channel parameter, a radio channel parameter used when the UE accesses the media service.

In this embodiment of the present invention, after calculating the radio channel parameter, the VNO platform may transmit these parameters to a PCRF entity of a CN in real time; after receiving these parameters, the PCRF entity may adjust in real time a radio channel parameter of a UE in a user queue of a wireless base station or a GW. In this way, experience of a user in accessing a media service can be ensured.

In the foregoing embodiment, user A sells a traffic package for a defined time period 20:00-22:00 to user B; therefore, in this time period, when user B accesses a media service by using a UE, a VNO collects, in the foregoing manner, a real-time user experience index and a media service transmission parameter when user B accesses the media service, calculates a radio channel parameter for user B when a user experience level is raised to 5, and notifies a core network device, so that the core network device can adjust in real time a radio channel parameter for access to the media service by user B. In this way, experience of a user in accessing a media service can be ensured in a defined time period of an ordered traffic package, to arouse enthusiasm for traffic trading.

In this embodiment of the present invention, after completing the traffic package trading between the two trading parties, the VNO may charge the two trading parties, where there are two billing manners, that is, non-real-time billing and real-time billing. In non-real-time billing, the VNO platform may further record billing information of the trading users, for example, account balances, lists of trading details, and lists of call details. The VNO platform may regularly send user traffic package update information including information about an ordered traffic package, in form of a payment (trading) file, to an AR of a billing system, and the AR uploads the file to a CBP to execute batch payment. In the real-time billing manner, when user A and user B complete the trading, the VNO platform may send the user traffic package update information including information about the ordered traffic package to a BMP of the billing system; after receiving the user traffic package update information, the BMP may send the user traffic package update information to the CBP; the CBP modifies account record information of the corresponding users and feeds the modified account record information back to the GW and the VNO platform.

It can be seen from the foregoing embodiment that this embodiment of the present invention can ensure, in a defined time period of an ordered traffic package, experience of a user in accessing a media service, to arouse enthusiasm for traffic trading.

Figure 5:
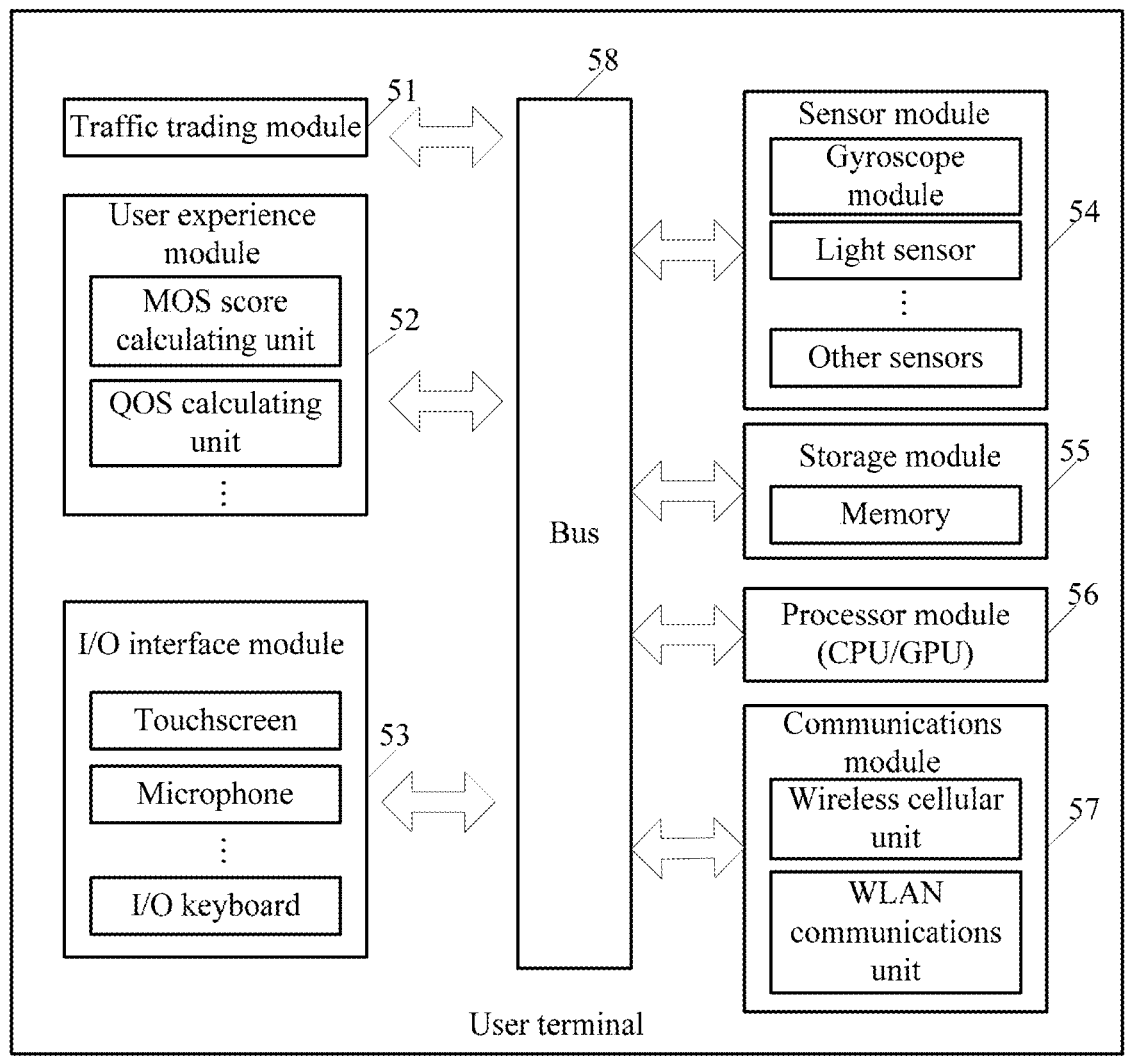
FIG. 5 is a schematic structural diagram of a user terminal disclosed in an embodiment of the present invention.

Referring to FIG. 5, FIG. 5 is a schematic structural diagram of a user terminal disclosed in an embodiment of the present invention. As shown in FIG. 5, the user terminal may include a traffic trading module 51, a user experience module 52 (which mainly includes an MOS score calculating unit, a QOS calculating unit, and the like), an I/O interface module 53 (which mainly includes a touchscreen, an I/O keyboard, a microphone, and the like), a sensor module 54 (which mainly includes a gyroscope sensor, a light sensor, and other sensors), a storage module 55 (which mainly includes a memory), a processor module 56 (which mainly includes a CPU/GPU), a communications module 57 (which mainly includes a wireless cellular unit and a WLAN communications unit), and a bus 58 connecting the foregoing modules, where the traffic trading module 51 may provide a UI interface for traffic trading to a user, and provide a communications interface connected to the VNO platform.

The user experience module 52 is configured to collect a real-time user experience index (for example, a real-time MOS score) for access to a media service (which is provided by a server) by the user terminal in a defined time period of a current traffic package.

The communications module 57 is configured to: when the real-time user experience index is less than a preset user experience index, obtain a media service type of the media service provided by the server.

The traffic trading module 51 is configured to obtain a user experience level of the current traffic package and a radio resource utilization rate of a wireless base station to which the UE belongs.

The processor module 56 is configured to: when the radio resource utilization rate of the wireless base station to which the user terminal belongs is higher than a preset radio resource utilization rate, compare whether a user experience level that is required by the media service type is higher than the user experience level of the current traffic package.

The traffic trading module 51 is further configured to: when the user experience level that is required by the media service type is higher than the user experience level of the current traffic package, access a traffic trading platform (for example, a VNO platform), and actively search for a to-be-ordered traffic package meeting the user experience level that is required by the media service type.

In this embodiment of the present invention, the traffic trading module 51 may obtain the user experience level of the current traffic package from a core network device or the traffic trading platform, and obtain, from a scheduler configured for RRC of the wireless base station to which the user terminal belongs, the radio resource utilization rate of the wireless base station to which the UE belongs. The radio resource utilization rate may be a bandwidth occupancy rate of the wireless base station, or a user access rate.

In this embodiment of the present invention, by using the user terminal shown in FIG. 5, a user searches for, according to a requirement (selling a traffic package or buying a traffic package) of the user by using the traffic trading module 51 and from the VNO platform, a traffic package meeting a requirement (a requirement such as a user experience level, a use time period, and a size) to perform trading. During this process, the user terminal is an ingress to the VNO platform, and completes the trading by communicating with the VNO platform. A specific trading process includes:

1) The user starts a traffic trading module, and inputs a to-be-ordered traffic package parameter, which includes a size, a defined time period, a user experience level, and a price that are of a to-be-ordered traffic package, and may further include a use location;

2) The traffic trading module requests, from a traffic trading platform according to the input to-be-ordered traffic package parameter, a to-be-ordered traffic package in conformity with the to-be-ordered traffic package parameter;

3) The traffic trading module receives the to-be-ordered traffic package that is in conformity with the to-be-ordered traffic package parameter and sent by the traffic trading platform, and presents the to-be-ordered traffic package to the user, where the to-be-ordered traffic package parameter includes the user experience level;

4) The user selects an ordered traffic package from the traffic trading module, and feeds a selection result back to the traffic trading platform; and 5) The user confirms ordering of the ordered traffic package that is selected (including payment information confirmation), and receives an order result sent by the traffic trading platform.

Figure 6:
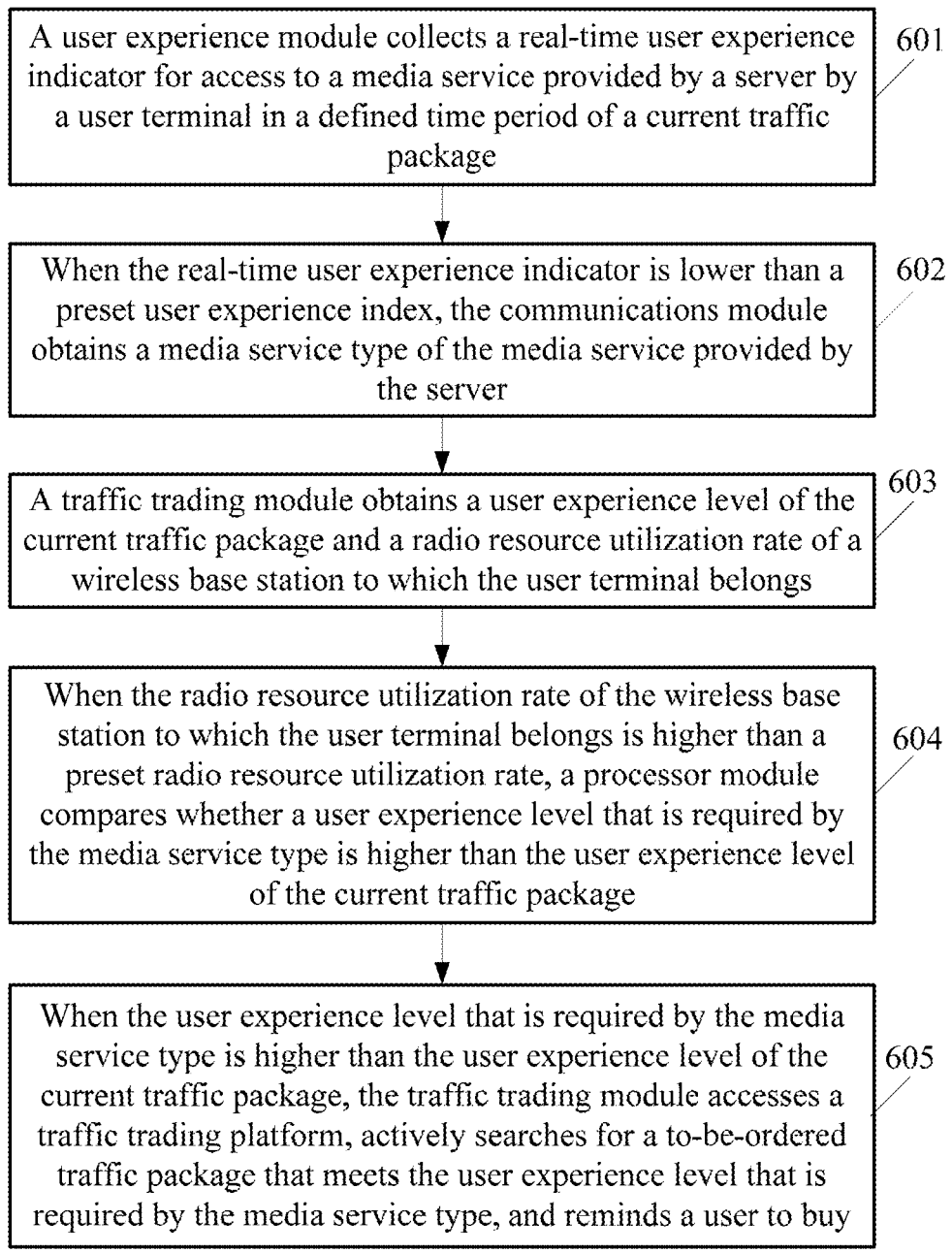
FIG. 6 is a schematic flowchart of a traffic package recommending method disclosed in an embodiment of the present invention.

In this embodiment of the present invention, the user terminal shown in FIG. 5 may further intelligently recommend to a user an ordered traffic package that can ensure experience of the user in accessing a media service. A specific recommendation process is shown in FIG. 6, and may include the following steps:

601: The user experience module collects a real-time user experience index for access to a media service provided by a server by the user terminal in a defined time period of a current traffic package.

602: When the real-time user experience index is less than a preset user experience index, the communications module obtains a media service type (for example, video, text, and music) of the media service provided by the server.

603: The traffic trading module obtains a user experience level of the current traffic package and a radio resource utilization rate of a wireless base station to which the user terminal belongs.

604: When the radio resource utilization rate of the wireless base station to which the user terminal belongs is higher than a preset radio resource utilization rate, the processor module compares whether a user experience level that is required by the media service type is higher than the user experience level of the current traffic package.

605: When the user experience level that is required by the media service type is higher than the user experience level of the current traffic package, the traffic trading module accesses the traffic trading platform, actively searches for a to-be-ordered traffic package meeting the user experience level that is required by the media service type, and reminds the user to buy the traffic package.

A scheduler and a dynamic resource allocation module are configured in an RRC of a wireless base station. In step 603 in the foregoing procedure, the traffic trading module may obtain, from the scheduler configured for RRC of the wireless base station, such information as a resource utilization rate of the air-interface, and a statistical distribution of user experience levels of all access users. For example, when a user is watching an online high-definition video, and a user experience level of the user is 3, in a time period, users accessing the wireless base station increase, so that air-interface resources of the wireless base station are in short supply, especially that the number of users with a user experience level higher than 3 increases. In this case, the wireless base station can no longer ensure that the user with the user experience level 3 continues to watch the online high-definition video. However, according to calculation (the calculation work may be completed by the wireless base station, the user terminal, or the traffic trading platform), a traffic package with a user experience level of 4 can support an online high-definition video. Then, the traffic trading module may search for, from the traffic trading platform, a to-be-ordered traffic package with a user experience level higher than 4, and recommend the traffic package to the user.

In this embodiment of the present invention, the traffic trading platform can ensure, in a defined time period of an ordered traffic package, experience of a user in accessing a media service, to arouse enthusiasm for traffic trading.

In addition, in this embodiment of the present invention, a UE may also intelligently search for a to-be-ordered traffic package whose user experience level meets the t media service type of accessed media service, to ensure experience of the user in accessing the media service, which can arouse enthusiasm for traffic trading.

Persons of ordinary skill in the art may understand that all or a part of the steps of the methods in the embodiments may be implemented by a program instructing relevant hardware. The program may be stored in a computer readable storage medium. The storage medium may include a flash memory, a read-only memory (Read-Only Memory, ROM), a random access memory (Random Access Memory, RAM), a magnetic disk, and an optical disk.

The foregoing describes in detail the radio channel control method, the traffic package recommending method, and the related device disclosed in the embodiments of the present invention. Although the principles and implementation manners of the present invention are described by using specific examples, the foregoing embodiments are only intended to help understand the method and the core idea of the present invention. In addition, with respect to the specific implementation manners and application scope of the present invention, modifications may be made by a person of ordinary skill in the art according to the idea of the present invention. Therefore, the specification shall not be construed as a limitation on the present invention.

What is claimed is:

1. A radio channel control method comprising:
   collecting, by a traffic trading platform, a real-time user experience index for enabling a first user terminal to access a media service provided by a server in a defined time period of an ordered traffic package,
     wherein the real-time user experience index comprises a real-time mean opinion score (MOS) or a quality of service (QOS) value, and
     the ordered traffic package is a traffic package bought by the first user terminal from a second user terminal;
   collecting, by the traffic trading platform, a media service transmission parameter of the media service provided by the server;
   determining, by the traffic trading platform, whether the real-time user experience index is lower than a user experience index defined in a user experience level of the ordered traffic package;

in response to determining the real-time user experience index is lower than the user experience index, obtaining, by the traffic trading platform, a first radio channel parameter that is required by the user experience index by using the real-time user experience index and the media service transmission parameter; and transmitting, by the traffic trading platform, the first radio channel parameter to a core network device to enable the core network device to adjust, according to the first radio channel parameter, a second radio channel parameter used by the first user terminal when accessing the media service.

2. The method according to claim 1, wherein obtaining the first radio channel parameter comprises:

obtaining, by the traffic trading platform, a radio channel bandwidth value increment according to the media service transmission parameter, wherein the media service transmission parameter comprises one of the following:
  (a) a time length of the media service, an average rate of accessing the media service, and a variance of the average rate, and
  (b) the time length of the media service and a variance of the average rate of accessing the media service;

obtaining, by the traffic trading platform, a difference between the user experience index and the real-time user experience index;

obtaining, by the traffic trading platform, a product of the difference, a radio channel scheduling priority defined in the user experience level, and the radio channel bandwidth value increment; and obtaining, by the traffic trading platform, a sum of the product and a radio channel bandwidth value defined in the user experience level, as a radio channel bandwidth value that is required by the user experience index.

3. The method according to claim 1, wherein obtaining the first radio channel parameter comprises:

obtaining, by the traffic trading platform, a radio channel scheduling priority increment according to the media service transmission parameter, wherein the media service transmission parameter comprises one of the following:
  (a) a time length of the media service, an average rate of accessing the media service, and a variance of the average rate, and
  (b) the time length of the media service and a variance of the average rate of accessing the media service;

obtaining, by the traffic trading platform, a difference between the user experience index and the real-time user experience index; and obtaining, by the traffic trading platform, a product of the difference, a radio channel scheduling priority defined in the user experience level, and a radio channel bandwidth increment, as a radio channel scheduling priority that is required by the user experience index.

4. The method according to claim 1, wherein before collecting the real-time user experience index, the method further comprises:

receiving, by the traffic trading platform, a traffic package query request sent by the first user terminal, wherein the traffic package query request comprises a to-be-ordered traffic package parameter;

performing, by the traffic trading platform, identity authentication on the first user terminal;

upon success of the identity authentication, querying, by the traffic trading platform, a traffic package in conformity with the to-be-ordered traffic package parameter, and sending the traffic package to the first user terminal;

receiving, by the traffic trading platform, an ordered traffic package sent by the first user terminal, wherein the ordered traffic package is the traffic package in conformity with the to-be-ordered traffic package parameter; and sending, by the traffic trading platform, user traffic package update information, comprising information about the ordered traffic package to a billing system, to enable the billing system to update, according to the ordered traffic package, a stored traffic package of the first user terminal and a stored traffic package of a seller of the ordered traffic package.

5. The method according to claim 4, wherein the method further comprises:

sending, by the traffic trading platform, the user traffic package update information comprising information about the ordered traffic package to the core network device, to enable the core network device to update, according to the ordered traffic package, the stored traffic package of the first user terminal and the stored traffic package of the seller of the ordered traffic package.

6. The method according to claim 5, wherein the billing system deducts, from an account of a user associated with the first user terminal, according to the ordered traffic package, an order amount associated with a price of the ordered traffic package, and adds the order amount to an account of the seller.

7. The method according to claim 4, wherein the to-be-ordered traffic package parameter comprises one of the following:
  (a) a size, a defined time period, the user experience level, and a price of the to-be-ordered traffic package; and
  (b) the size, the defined time period, the user experience level, the price, and a use location of the to-be-ordered traffic package.

8. The method according to claim 1, wherein before collecting the real-time user experience index, the method further comprises:

obtaining, by the traffic trading platform, the real-time user experience index from the first user terminal for the first user terminal's access to the media service in a defined time period of a current traffic package;

upon the real-time user experience index being lower than a preset user experience index, obtaining, by the traffic trading platform, a media service type of the media service provided by the server;

obtaining, by the traffic trading platform, a user experience level of the current traffic package and a radio resource utilization rate of a wireless base station to which the first user terminal belongs;

upon the radio resource utilization rate beingis higher than a preset radio resource utilization rate, comparing, by the traffic trading platform, a user experience level required by the media service type and the user experience level of the current traffic package; and upon the user experience level required by the media service type being higher than the user experience level of the current traffic package, searching, by the traffic trading platform, for a to-be-ordered traffic package meeting the user experience level required by the media service type, and recommending the to-be-ordered traffic package to the first user terminal.

9. A traffic trading server comprising:
a processor;
a transmitter; and
a memory coupled to the processor and including processor-executable instructions stored therein, which when executed by the processor, cause the processor to be configured to provide at least the following operations:
collecting a real-time user experience index for enabling a first user terminal to access a media service provided by a server in a defined time period of an ordered traffic package,
wherein the user experience index comprises a real-time mean opinion score (MOS) score or a quality of service (QOS) value, and
wherein the ordered traffic package is a traffic package bought by the first user terminal from a second user terminal,
collecting a media service transmission parameter of the media service provided by the service server;
determining whether the real-time user experience index is less than a user experience index defined in a user experience level of the ordered traffic package; and
in response to determining the real-time user experience index is less than the user experience index defined in the user experience level of the ordered traffic package, obtaining a first radio channel parameter that is required by the user experience index by using the real-time user experience index and the media service transmission parameter; and
the transmitter configured to cooperate with the processor to transmit the first radio channel parameter to a core network device, to enable the core network device to adjust, according to the first radio channel parameter, a second radio channel parameter used when the first user terminal accesses the media service.

10. The traffic trading server according to claim 9, wherein:
the processor is further configured to obtain a radio channel bandwidth increment according to the media service transmission parameter,
wherein the media service transmission parameter comprises one of the following:
(a) a time length of the media service, an average rate of accessing the media service, and a variance of the average rate, and
(b) the time length of the media service and the variance of an average rate of accessing the media service; and
the processor is also further configured to obtain the first radio channel parameter required by the user experience index by providing at least the following operations:
obtaining a difference between the user experience index and the real-time user experience index;
obtaining a product of the difference, a radio channel scheduling priority defined in the user experience level, and the radio channel bandwidth increment; and
obtaining a sum of the product and a radio channel bandwidth defined in the user experience level, as a radio channel bandwidth that is required by the user experience level.

11. The traffic trading server according to claim 9, wherein:
the processor is further configured to
obtain a radio channel scheduling priority increment according to the media service transmission parameter, wherein the media service transmission parameter comprises one of the following:
(a) a time length of the media service, an average rate of accessing the media service, and a variance of the average rate, and
(b) a time length of the media service and a variance of an average rate of accessing the media service; and
wherein obtaining a first radio channel parameter required by the user experience index comprises:
obtaining a difference between the user experience index and the real-time user experience index; and
obtaining a product of the difference, a radio channel scheduling priority defined in the user experience level, and the radio channel bandwidth increment, as a radio channel scheduling priority that is required by the user experience level.

12. The traffic trading server according to claim 9, wherein the processor is further configured to provide the following operations:
receiving a traffic package query request sent by the first user terminal, wherein the traffic package query request comprises a to-be-ordered traffic package parameter, and the to-be-ordered traffic package parameter comprises a defined time period for use of a to-be-ordered traffic package or a user experience level of the to-be-ordered traffic package;
performing identity authentication on the user terminal; and
after the identity authentication performed by the authentication and management module on the first user terminal succeeds, querying a traffic package in conformity with the to-be-ordered traffic package parameter, wherein the to-be-ordered traffic package meets a requirement of the defined time period or the user experience level, and
wherein the transmitter is further configured to cooperate with the processor to send the traffic package to the user terminal.

13. The traffic trading server according to claim 12, wherein the processor is further configured to set a quantity of orderable traffic packages according to radio resources of a base station, a time, and a location.

14. The traffic trading server according to claim 12, wherein the processor is further configured to provide the following operations:
limiting, according to a radio resource usage situation of a base station, a quantity of orderable traffic packages with a high user experience level, and specifying the defined time period and a use location that are of the to-be-ordered traffic package, to meet a user experience requirement of a user associated with the to-be-ordered traffic package; and
in response to determining the quantity of traded traffic packages is less than the quantity of orderable traffic packages, receiving the traffic package query request sent by the first user terminal.

15. The traffic trading server according to claim 12, wherein:
the traffic package parameter further comprises use location information;

the traffic package query request that is sent by the first user terminal and received by the processor comprises the use location information;

the to-be-ordered traffic package queried by the processor further meets a requirement of the use location information; and wherein the to-be-ordered traffic package is used by the first user terminal at a location determined by the use location information.

16. The traffic trading server according to claim 12, wherein the processor is further configured to provide the following operations:

receiving an ordered traffic package sent by the first user terminal, wherein the ordered traffic package is a traffic package selected by the first user terminal from a set of traffic packages in conformity with the to-be-ordered traffic package parameter, and wherein the ordered traffic package is used in the defined time period, or the user experience level is obtained when the first user terminal uses the ordered traffic package; and sending user traffic package update information comprising information about the ordered traffic package to a billing system, to enable the billing system updates, according to the ordered traffic package, a stored traffic package of the user and a stored traffic package of a seller of the ordered traffic package.

17. The traffic trading server according to claim 16, wherein:

the transmitter is further configured to cooperate with the processor to send the user traffic package update information comprising information about the ordered traffic package to the core network device, to enable the core network device updates, according to the ordered traffic package, a stored traffic package of the user and a stored traffic package of the seller of the ordered traffic package.

18. The traffic trading server according to claim 17, wherein the processor is further configured to, after receiving the ordered traffic package sent by the first user terminal, record a fee that is deducted from the account of the user and associated with the ordered traffic package.

19. The traffic trading server according to claim 9, wherein the processor is further configured to provide the following operations:

before collecting the real-time user experience index for access to the media service by the user terminal, collecting a real-time user experience index for access to the media service by the first user terminal in a defined time period of a current traffic package;

upon the real-time user experience index for access to the media service by the first user terminal in the defined time period of the current traffic package being lower than a preset user experience index, obtaining a media service type of the media service provided by the server;

obtaining a user experience level of the current traffic package and a radio resource utilization rate of a wireless base station to which the first user terminal belongs;

upon the radio resource utilization rate of the wireless base station being higher than a preset radio resource utilization rate, determining whether a user experience level required by the media service type is higher than the user experience level of the current traffic package;

upon the user experience level required by the media service type being higher than the user experience level of the current traffic package, searching for a to-be-ordered traffic package meeting the user experience level that is required by the media service type; and recommending the to-be-ordered traffic package to the first user terminal.

\* \* \* \* \*

UNITED STATES PATENT AND TRADEMARK OFFICE
CERTIFICATE OF CORRECTION

PATENT NO. : 10,991,019 B2
APPLICATION NO. : 14/720424
DATED : April 27, 2021
INVENTOR(S) : Huo et al.

It is certified that error appears in the above-identified patent and that said Letters Patent is hereby corrected as shown below:

In the Claims

Claim 8: Column 24, Line 56: "upon the radio resource utilization rate beingis higher than" should read -- upon the radio resource utilization rate being higher than --.

Signed and Sealed this
Tenth Day of May, 2022

Katherine Kelly Vidal
Director of the United States Patent and Trademark Office